United States Patent
Burke et al.

(10) Patent No.: US 9,866,614 B2
(45) Date of Patent: *Jan. 9, 2018

(54) METHODS FOR WEBSITE VERSION CONTROL USING BUCKET COOKIES

(71) Applicant: Go Daddy Operating Company, LLC, Scottsdale, AZ (US)

(72) Inventors: Jeffrey M. Burke, Scottsdale, AZ (US); Ricardo Canedo, Goodyear, AZ (US); Thomas J. Femiani, Gilbert, AZ (US); Michael J. Micco, Scottsdale, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,025

(22) Filed: Dec. 28, 2016

(65) Prior Publication Data

US 2017/0111430 A1    Apr. 20, 2017

Related U.S. Application Data

(63) Continuation of application No. 14/511,498, filed on Oct. 10, 2014, now Pat. No. 9,565,271.

(51) Int. Cl.
*G06F 15/16*    (2006.01)
*H04L 29/08*    (2006.01)
*H04L 29/06*    (2006.01)

(52) U.S. Cl.
CPC ............. *H04L 67/02* (2013.01); *H04L 67/10* (2013.01); *H04L 67/14* (2013.01); *H04L 67/16* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,006,993 B1* | 2/2006 | Cheong | G06Q 20/02 705/35 |
| 7,203,720 B2* | 4/2007 | Smedberg | G06F 17/30887 707/E17.115 |
| 7,380,013 B2* | 5/2008 | Brandrud | H04L 29/06 379/93.02 |
| 8,930,443 B1* | 1/2015 | Warner | H04L 67/141 709/203 |
| 9,059,966 B2* | 6/2015 | Agarwal | H04L 63/0281 |

(Continued)

*Primary Examiner* — Joshua Joo
(74) *Attorney, Agent, or Firm* — Quarles & Brady LLP

(57) ABSTRACT

A system and method are presented for addressing or requesting different versions of a web resource. A first web server electronically connected to a computer network receives from a requestor a first web resource request. The first web resource request includes a bucket cookie and a first web resource address for a first web resource. The bucket cookie includes at least one resource-related bucket cookie value. A second web resource request is generated. The second web resource request corresponds to at least a second web resource required to fulfill the first web resource request. The second web resource request is different from the first web resource request and includes a second web resource address corresponding to the second web resource and including the bucket cookie. The second web resource request is transmitted to a second web server.

19 Claims, 5 Drawing Sheets

(56) References Cited

U.S. PATENT DOCUMENTS

| | | | | |
|---|---|---|---|---|
| 9,059,985 B1* | 6/2015 | Treleaven | ............... | H04L 63/08 |
| 2004/0103078 A1* | 5/2004 | Smedberg | ......... | G06F 17/30887 |
| 2004/0117486 A1* | 6/2004 | Bourne | ............ | G06F 17/30902 |
| | | | | 709/228 |
| 2006/0277596 A1* | 12/2006 | Calvert | ............... | H04L 63/0218 |
| | | | | 726/3 |
| 2011/0161825 A1* | 6/2011 | Tierney | ............... | G06F 11/3672 |
| | | | | 715/736 |
| 2014/0067780 A1* | 3/2014 | Lipscomb | ......... | G06F 17/30309 |
| | | | | 707/695 |
| 2016/0261699 A1* | 9/2016 | Martin | ................. | H04L 67/146 |

* cited by examiner

METHODS FOR WEBSITE VERSION CONTROL USING BUCKET COOKIES

FIELD OF THE INVENTION

The present invention generally relates to web resources, and, more specifically, to methods for addressing or requesting different versions of a web resource with bucket cookies.

BACKGROUND OF THE INVENTION

Web-based software systems are often complex systems with many inter-twined subsystems. One particular subsystem will not know all the subsystems involved in the user's request/experience. Users of these web-based systems get one version of each particular subsystem working to fulfill the user's request. Those versions of the subsystems are typically specified by the system itself and not by the user of the system. Indeed, in general, a common user would not know how to judge what versions of each subsystem to engage for their web request. However, Testing, Quality Assurance, Development, and other pre-release users routinely need to access highly specific versions of one or more subsystems out of the whole collection of inter-twined subsystems.

Existing solutions for requesting particular versions of web resources at run-time may involve including a version number or other identifier of a particular version into a website address as a sub-domain, folder, or query portion. Though suitable for some applications, these solutions do not meet the needs of all applications and/or settings. For example, backend services or other second-level web services are excluded from such direct run-time version specification. A user cannot easily access a user-facing page of a website and directly specify which version of a backend service to use (e.g., which version of a mail service or of a news ticker service to use). To do so would require multiple versions of the user-facing page that each corresponds to different versions of backend services. For example, if three versions of one particular backend service are specifiable, then three different versions of the user-facing page must be created and individually maintained. A user can then call one of these three user-facing pages to access different versions of the backend service. If a second backend service also has three different versions that are specifiable, then nine versions of the user-facing page must be created and maintained in order access all permutations of the website. As can be readily understood, the burden of creating and maintaining multiple different versions of specifiable user-facing web pages in order to test or access multiple different versions of backend services increases rapidly as the number of variations increases. Further, it is not possible to specify at run-time various versions of additional backend services that exist behind the first layer of backend services.

DETAILED DESCRIPTION OF THE PREFERRED EMBODIMENT

Figure 1:
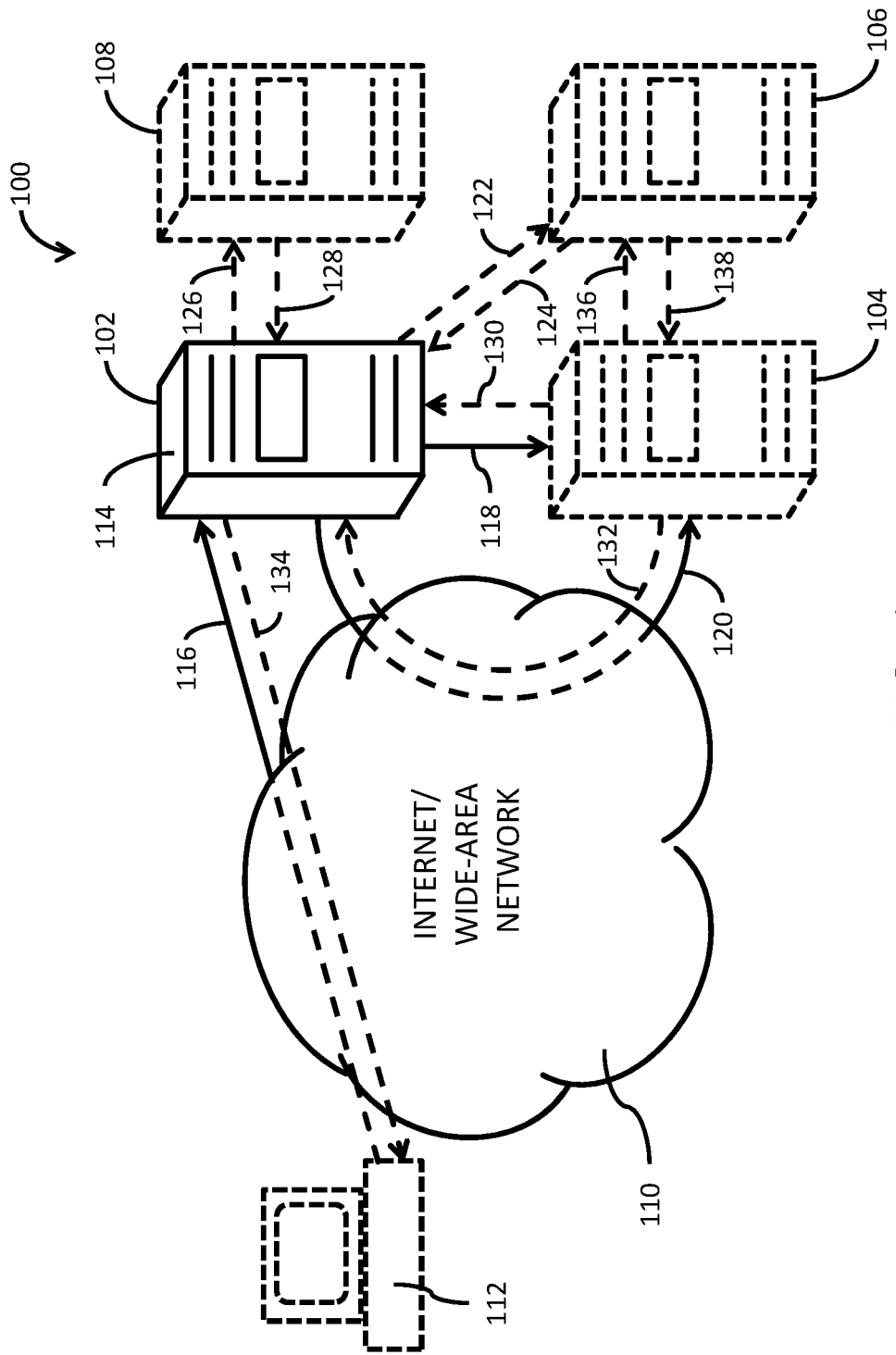
FIG. 1 is a schematic diagram of a web server and an associated contextual operating environment in accordance with various embodiments of the present disclosure.

The present invention overcomes the aforementioned drawbacks by providing a method for run-time specification of web resource versions that reduces or eliminates the complexity and overhead burden of creating and maintaining multiple versions of user-facing web resources to access various versions of second-level web resources. An understanding and/or mapping of received web resource requests to versions of web resources is not required to be maintained at the user-facing web resource level. The approach described herein allows for implementation of a virtually limitless variety of versions of web resources to be specified at run-time with little to no additional overhead maintenance. Further, the embodiments describe a mechanism by which users can elect to utilize particular versions of web resources without directly interacting with those web resources or without even having direct access to those web resources. Moreover, in some embodiments, run-time version specification can be propagated beyond a second level of web resources to further levels, thereby increasing the versatility of run-time version specification.

In one embodiment, a method includes receiving, by a first web server electronically connected to a computer network from a requestor electronically connected to the first web server via the computer network, a first web resource request. The first web resource request includes a bucket cookie and a first web resource address for a first web resource. The bucket cookie includes at least one resource-related bucket cookie value. The method includes generating, by the first web server, a second web resource request. The second web resource request corresponds to at least a second web resource required to fulfill the first web resource request. The second web resource request is different from the first web resource request and includes a second web resource address corresponding to the second web resource and including the bucket cookie. The method includes transmitting, by the first web server, the second web resource request to a second web server.

In another embodiment, a web server configured to receive a first web resource request. The first web resource request includes a first web resource address and a bucket cookie. The bucket cookie includes at least one resource-related bucket cookie value. The web server is configured to generate a second web resource request. The second web resource request corresponds to at least a second web resource related to the first web resource request. The second web resource request is different from the first web resource request and includes a second web resource address corresponding to the second web resource and including the bucket cookie. The web server is configured to request the second web resource with the second web resource request.

In another embodiment, a method includes receiving, by a first web server in electronic communication with a computer network from a client device in communication with the computer network, a first web resource request including a bucket cookie, and determining, by the first web server, whether the bucket cookie includes at least a first resource-related bucket cookie value corresponding to a first web resource to be provided by the first web server in response to the first web resource request. The method includes outputting, by the first web server, a second web resource request to a second web server for a second web resource. The second web resource request includes an unaltered version of the bucket cookie. The method includes receiving, by the first web server from the second web server in response to the second web resource request, a version of the second web resource corresponding to a second resource-related bucket cookie value of the bucket cookie, and providing, by the first web server to the client device, at least the first web resource and the second web resource.

Referring first to FIG. 1, web servers 100 are shown (e.g., servers, server devices, network servers, computer servers, or the like). The web servers 100 may include a first web server 102. In certain embodiments, the first web server 102 may be communicatively coupled to one or more other web servers 100, for example, a second web server 104, a third web server 106, and/or a fourth web server 108. The web servers 100 may each include one or more processing devices (such as one or more central processors) and may include or be communicatively coupled to a network interface. Each network interface may in turn be communicatively coupled to a wide-area network such as the Internet 110 thereby coupling each web server to the World Wide Web. Alternatively, various web servers 100 may be communicatively coupled over a local area network (LAN). In such a configuration, a collection of web servers 100 may operate together to provide a web resource (e.g., a website, webpage, web service, or the like). Each of the web servers 100 may be one of many servers, for example, as part of a server farm configured to service a large number of client devices 112. A plurality of web servers 100 may be communicatively coupled together through a network with other control computers configured to control aspects of the web servers and to route communications to and from the servers 100. In one embodiment, the web servers 100 are configured to communicatively couple to a client device 112 through the Internet 110 to provide a web resource to the client device 112. For example, as is shown in FIG. 1, the first web server 102 may be communicatively coupled to the client device 112 directly or through one or more intermediary web servers.

Communications between the servers 100 and/or the client device(s) 112 may be achieved using any electronic communication medium, communication protocol, and computer software suitable for transmission of data over the Internet 110 or a LAN. Examples include, respectively and without limitation: a wired connection, WiFi or other wireless network, cellular network, or satellite network; Transmission Control Protocol and Internet Protocol ("TCP/IP"), Global System for mobile Communications ("GSM") protocols, code division multiple access ("CDMA") protocols, and Long Term Evolution ("LTE") mobile phone protocols; web browsers such as MICROSOFT INTERNET EXPLORER, MOZILLA FIREFOX, and APPLE SAFARI; and other client-executable software modules.

The client device 112 may comprise various computing devices such as, for example, a desktop computer, a laptop computer, a tablet, a smart phone, other network servers, or any other electronic device capable of communicating with the servers 100 over the Internet 110. Such a client device 112 may include one or more processing devices, display devices, user interfaces, and/or network interfaces. Typically, though not always, the client device 112 is utilized by a user to access the servers 100 or a web resource provided by one or more of the servers 100. The user may be an individual, a group of individuals, a business or other organization, or any other entity that desires to access a web resource. For clarity of explanation, and not to limit the implementation of the present methods and devices, the methods are described herein as being performed primarily by the first web server 102 interfacing with a client device 112 or another server unless otherwise indicated. However, such methods are equally applicable to implementation on any one of a variety of servers 100.

Various ones of the web servers 100 may include or be configured to communicate electronically with one or more data stores in order to retrieve information from the data store. For example, the first web server 102 may include or be coupled to a data store 114. In some embodiments, a data store may be a component of one or more of the servers 100, such as, for example, a memory device within any one of the servers 100 or communicatively coupled to any one of the servers 100 (such as a memory module or a disk drive). In other embodiments, a data store may be part of one of the servers 100 and made accessible to other ones of the servers 100, or as part of a network-accessible data store. Electronic communication with the data store may be achieved over the Internet 110 using any suitable electronic communication medium, communication protocol, and computer software including, without limitation: a wired connection, WiFi or other wireless network, cellular network, or satellite network; TCP/IP or another open or encrypted protocol; browser software, application programming interfaces, middleware, or dedicated software programs. Electronic communication with the data store may be achieved over another type of network, such as an intranet or virtual private network, or may be via direct wired communication interfaces or any other suitable interface for transmitting data electronically from a data store to any one of the web servers 100. A data store may be any repository of information that is or can be made freely or securely accessible by the web server 100. In one embodiment, such a data store may store cached versions of web resources such as websites or web services.

In the present disclosure, the term web resource may include any webpage, website, code, content, communications, information, or data that may be provided to a client device 112 or another server electronically. The term website or webpage may include any public, private, or semi-private web property on which a user may maintain information and allow the information to be presented to the public or to a limited audience, and which is communicable via the Internet 110 or another network. Non-limiting examples of such web properties include websites, mobile websites, web pages within a larger website (e.g. profile pages on a social networking website), vertical information portals, distributed applications, and other organized data sources accessible by any device that may request data from a storage device (e.g., a client device in a client-server architecture), via a wired or wireless network connection, including, but not limited to, a desktop computer, mobile computer, telephone, or other wireless mobile device; content feeds and streams including RSS feeds, blogs and vlogs, YOUTUBE channels and other video streaming services, and the like; and downloadable digital platforms, such as electronic newsletters, blast emails, PDFs and other documents, programs, and the like.

The information on websites or web pages may be in the form of programmed source code that a client browser interprets to determine what to present or what action to take. The source code may include document formats, objects, parameters, positioning instructions, and other code that is defined in one or more web programming or markup languages. One web programming language is HyperText Markup Language ("HTML"), which most web pages use to some extent. HTML uses text indicators called tags to provide interpretation instructions to the browser. The tags specify the composition of design elements such as text, media, images, shapes, hyperlinks to other web pages, programming objects such as JAVA applets, form fields, tables, and other elements. The web page can be formatted for proper display on computer systems with widely varying display parameters, due to differences in screen size, resolution, processing power, and maximum download speeds.

In at least one embodiment, run-time version specification for web resources may be achieved using buckets. Buckets is a website deployment and installation technique that allows users to easily address or request different running versions of a web resource (e.g., a website or other hypertext transfer protocol (HTTP) application) while not changing the web resource's web address or code. In one embodiment, bucket cookies are used to provide the version addressing mechanism.

In a contextual example used throughout this disclosure, a team developing a website for www.example.com may implement the bucket cookies technique to test various features within the example.com website. For example, a first user may request a first bucket version of the website to test an email application feature branch, while a second user may request a second bucket version of the website to test a news ticker application feature branch. These tests may be performed while maintaining a live version of the website and without downtime in the live website or between tests. In one embodiment, the bucket versions are specified using bucket cookies that are passed to the web server along with the website request. The bucket cookie may be created by the users and may indicate a particular version of the web resource or website that is requested. A receiving web server can route the incoming request to the version of the web resource or website indicated in the bucket cookie.

In one embodiment, different versions of the base website can be created that request different particular versions of secondary web resources or backend services. In so doing, individual first-level feature branches can be tested by calling different versions of the main website. This embodiment may require that each version of the base website be programmed to call a particular version of a secondary web resource or be configured to map a received bucket cookie to a corresponding version of a secondary web resource. Though useful, such an approach may require knowledge of nearly every backend web service and its associated bucket cookie and/or versions, which can be burdensome to implement and maintain.

In another embodiment, a bucket cookie may be passed to a web server implementing a web resource (e.g., a website) along with the web resource request (e.g., website request). The web server can then pass the bucket cookie on to any requested secondary web resources (e.g., backend web resources) with which the web server communicates to fulfill the initial web resource request. In this embodiment, the web server need not know whether a particular version of the secondary web service was requested in the bucket cookie, or if the requested secondary web service even supports the bucket cookie technique. The secondary web service can then review the received bucket cookie and return a particular version of the secondary web service if a particular version is indicated in the bucket cookie. Further, in another embodiment, the secondary web service may propagate the bucket cookie to other web services it may subsequently call thereby allowing a user or a testing program to specify particular versions of even deeper subsystems beyond second level web resources. In one example implementation, this embodiment of the bucket cookies technique can be particularly useful for teams or individuals that use feature branching because this embodiment enables testing of different feature builds or branches within the same base operating environment.

Figure 2:
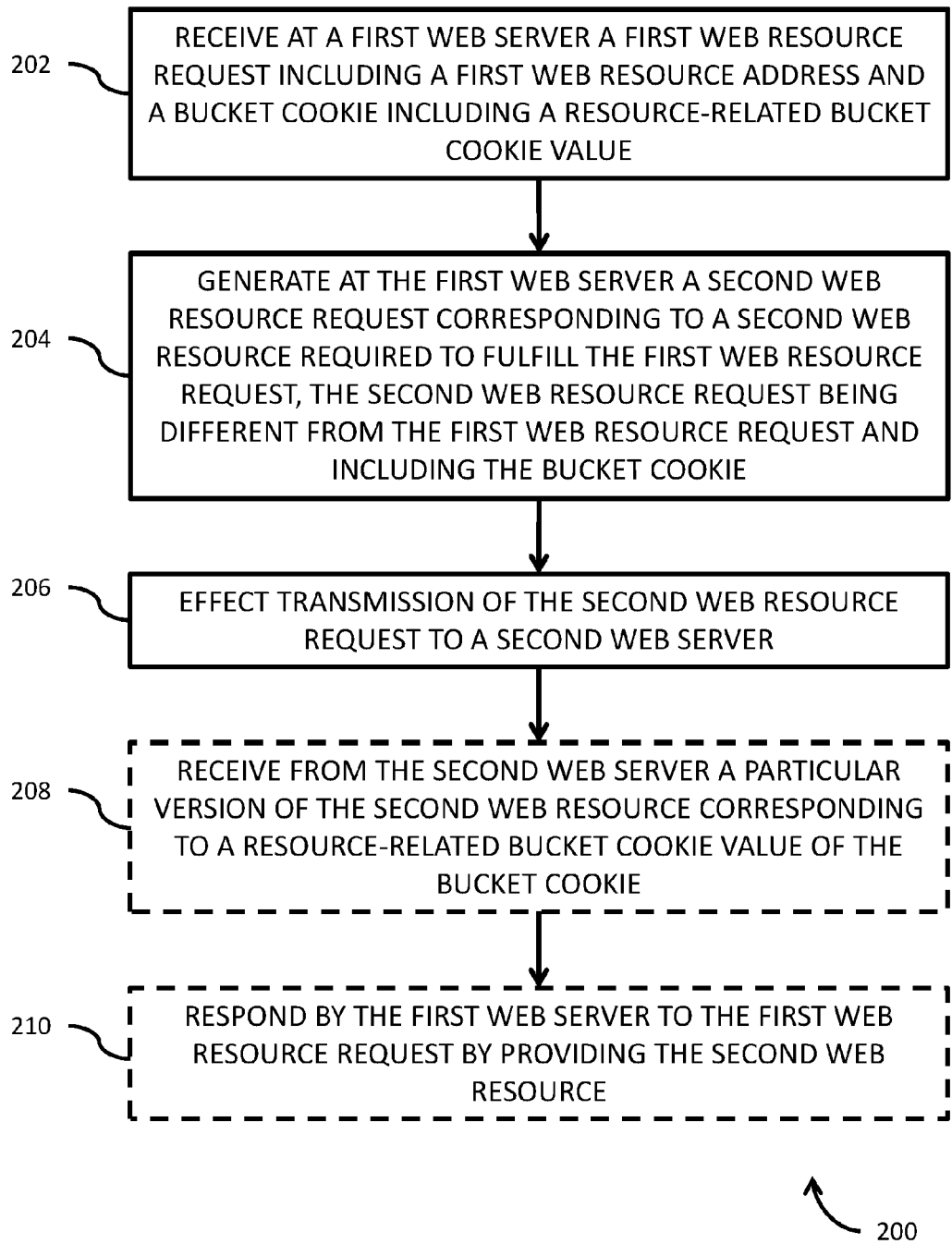
FIG. 2 is a flowchart depicting a method implementing bucket cookies in accordance with various embodiments of the present disclosure.

Turning now to FIG. 2, a flowchart is provided illustrating a method 200 in accordance with various embodiments. This method 200 is described with constant reference to the elements illustrated in FIG. 1, as well. Further, the first web server 102 may be configured to execute all or parts of the method 200 and other methods described herein. In one embodiment, at step 202, the first web server 102 receives a first web resource request. For example, the first web resource request may be a request for a website, web page, web content, data, code, or other web resources described herein and as understood by one of skill in the art. Receipt of the first web resource request is shown as the communication 116 received from the Internet 110. Though depicted in FIG. 1 as originating at a client device 112 and transmitted via the Internet 110, it should be understood that the origination of the web resource request may be from another web server or other device capable of communicating with the first web server 102. Additionally, the first web resource request may be received via other communication paths, including a LAN or other connections or networks described herein and as understood by one of skill in the art.

In one embodiment, the first web resource request comprises or includes a first web resource address (for example, a URL or other HTTP address). In certain examples, the first web server 102 is responsible for providing the requested web resource (e.g., the requested website). For example, the first web server 102 may have an Internet Protocol (IP) address corresponding to a Domain Name System (DNS) lookup related to the first web resource address (e.g., URL). In another example, the first web server 102 may receive the first web resource request after being routed through one or more front-end reception web servers configured to accept and route web resource requests to responsible web servers, for example, the first web server 102 in this embodiment. The first web resource request may also include therewith, or as a portion thereof, a bucket cookie. The bucket cookie includes at least one resource-related bucket cookie value. The bucket cookie and its resource-related bucket cookie values are described in further detail elsewhere in this disclosure.

At step 204, the first web server 102 generates a second web resource request. In one embodiment, this second web resource request is for a second web resource that is required to fulfill the first web resource request. For example, if the first web resource request is for a website or web page, the second web resource request may be a request for one or more secondary web resources such as backend services that are required as part of the website. The website, as managed by the first web server 102, is configured to utilize and call these backend services without further action by the initial requesting user, device, or entity. For example, if the requested website includes an email backend service, the first web server 102 generates the second web service request to receive the email backend service. The email backend service may thereafter be integrated into the requested website or returned to the originating requester as part of the requested website by the first web server 102. Innumerable examples of secondary web resources and backend services are possible and the present disclosure contemplates that the teachings described herein may be applied equally to most if not all secondary web resources or backend services.

In certain embodiments, the second web resource request is different from the first web resource request and may include a second web resource address corresponding to the second web resource. For example, if the first web resource request is a URL http://www.example.com, the second web resource request may be a different URL http://email_service.xyz.com to request an email backend service.

The second web resource request also includes the bucket cookie. In one embodiment, this bucket cookie of the second web resource is an unaltered version of the original bucket cookie received as part of the first web resource request. By including the unaltered bucket cookie in the second web request, the bucket cookie and all of its resource-related bucket cookie values specifying particular versions of web resources can be passed along to other secondary web servers providing secondary web resources or services. In certain embodiments, these secondary web servers may then review the bucket cookie received as part of the second web resource request to determine if it includes a resource-related bucket cookie value corresponding to a web resource it provides. In an embodiment where the bucket cookie includes a resource-related bucket cookie value corresponding to a particular version of the second web resource, the second web server 104 may responsively provide the indicated version of the second web resource. In this manner, the website as managed by the first web server 102 need not be aware of all versions of secondary web services (or web services even beyond that). The first web server 102 instead passes the bucket cookie along to allow the secondary services to handle their own version management as may be specified in the bucket cookie.

At step 206, the method 200 includes effecting transmission of the second web resource request to a second web server 104. This is indicated in FIG. 1 by communication 118 and/or 120. Much as the first web resource request may be received in a multitude of different manners from a variety of originating sources, so too can the second web resource request be sent. For example, the second web resource request can be sent to the second web server 104 via local communication 118 through a direct connection or through a LAN. Alternatively, second web resource request can be sent via the Internet 110 via communication 120. Indeed, in certain embodiments, the first web server 102 may similarly communicate with multiple other web servers 100, including the third web server 106 as indicated by communications 122 and 124 and the fourth web server 108 as indicated by communications 126 and 128 locally or through the Internet 110.

In certain embodiments, the first web server 102 and the second web server 104 (or any of the web servers 100) may be owned, operated, and/or managed by a single entity. Additionally, although the web servers 100 are depicted and described as separate hardware entities, in certain embodiments various ones of the web servers 100 (for example, the first web server 102 and the second web server 104) may be the same single web server implementing both the first web resource and the second web resource. In such an embodiment, a first web resource may require the use of another locally stored and/or managed web resource (e.g., module of code, etc.) on the same web server as the second web resource. In such an instance, for example, the second web resource address may be a simple local file location address or the like, as opposed to a URL. In other embodiments, the first web server 102 and the second web server 104 (or any of the web servers 100) may be owned, operated, and/or managed by separate entities. These separate entities may co-operate through various agreements to provide the web resources (for example, a fee may be provided to access and use the second web resource).

According to various embodiments, at step 208, the first web server 102 receives from the second web server 104 the second web resource. In an embodiment where the bucket cookie includes a resource-related bucket cookie value corresponding to a particular version of the second web resource, the received second web resource may be that particular version of the second web resource corresponding to the resource-related bucket cookie value included in the bucket cookie. Again, this occurs without the first web server 102 being required to have the knowledge of this version or even that a particular version of the second web resource was requested.

In certain embodiments, in step 210, the first web server 102 responds to the first web resource request by providing the second web resource as at least a part of its response. Such a response is shown as communication 134 via the Internet 110, though other methods of communication as discussed herein or elsewhere may be equally as applicable.

Figure 3:
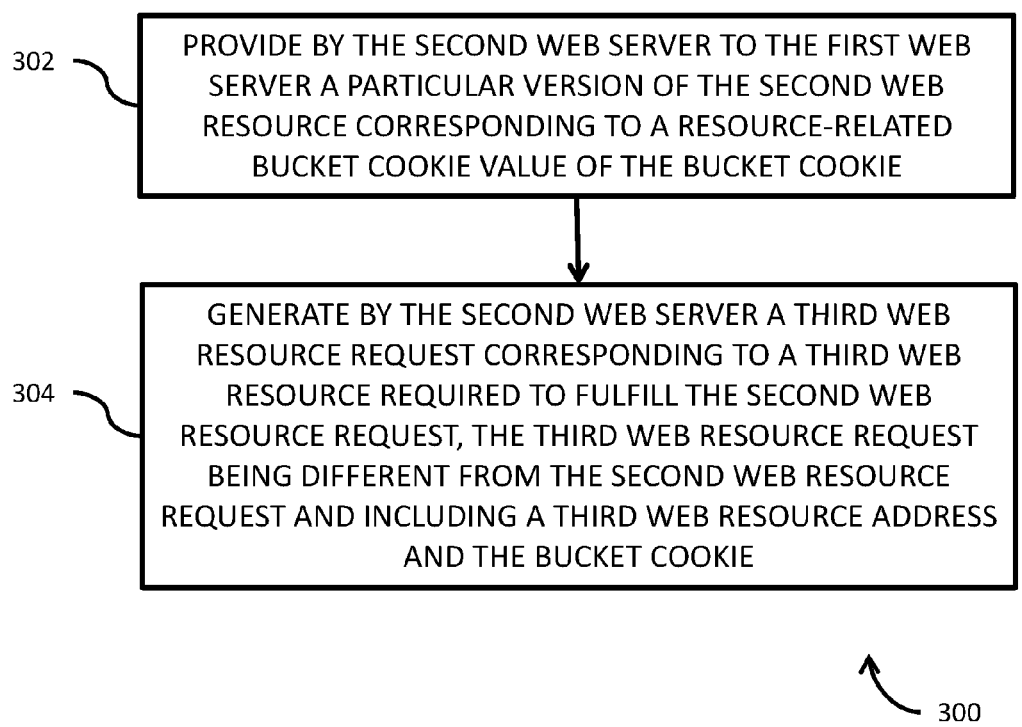
FIGS. 3-5 are flowcharts depicting variations of the method of FIG. 2 in accordance with various embodiments of the present disclosure.

Turning now to FIG. 3, an alternative method 300 is illustrated in accordance with various embodiments. Again, this method 300 is described with constant reference to the elements illustrated in FIG. 1. At step 302, as alluded to above, in an embodiment where the bucket cookie includes a resource-related bucket cookie value corresponding to a particular version of the second web resource, the second web server 104 may respond to the second web resource request by providing the particular version of the second web resource corresponding to the resource-related bucket cookie value. Continuing the previous example, if the second web server 104 stores, manages, and/or runs the email backend service, the second web server 104 can provide a particular version of that email backend service identified by the bucket cookie. However, in an embodiment where a particular version of the second web resource is not specified in the bucket cookie, the second web server 104 may simply return the current live version of the web resource as it would in response to a normal resource request without the bucket cookie.

In certain embodiments, the second web server 104 may need to call further backend web services itself. For example, the second web server 104 running an email backend web service may need to invoke an email inbox web service that is provided on a third web server 106. The second web server 104 can propagate the bucket cookie by including it in any subsequent web resource requests it may make. At step 304, the second web server 104 may generate a third web resource request corresponding to a third web resource required to fulfill the second web resource request. The third web resource request may be different from the second web resource request (for example, a URL http://email_inbox.xyz.com). Further, the third web resource request may include the bucket cookie. The second web server 104 may then transmit the third web resource request including the bucket cookie to the third web server 106 as indicated in FIG. 1 by communication 136. The third web server 106 can subsequently respond with the requested third web resource as is indicated by communication 138. The third web resource may be a particular version specified in the bucket cookie or the presently offered live version of the third web resource if no particular version is specified.

This step 304 may be recursively performed again by the third web server 106 passing the bucket cookie in a resource request to a fourth web server 108, and so forth. By this, a user at an originating client device 112 is capable of specifying particular versions of tertiary web resources (and other web resources beyond that as well) without the first web server 102 requiring knowledge of the various versions of web resources or even knowing that a particular version of a web resource was specified.

Figure 4:
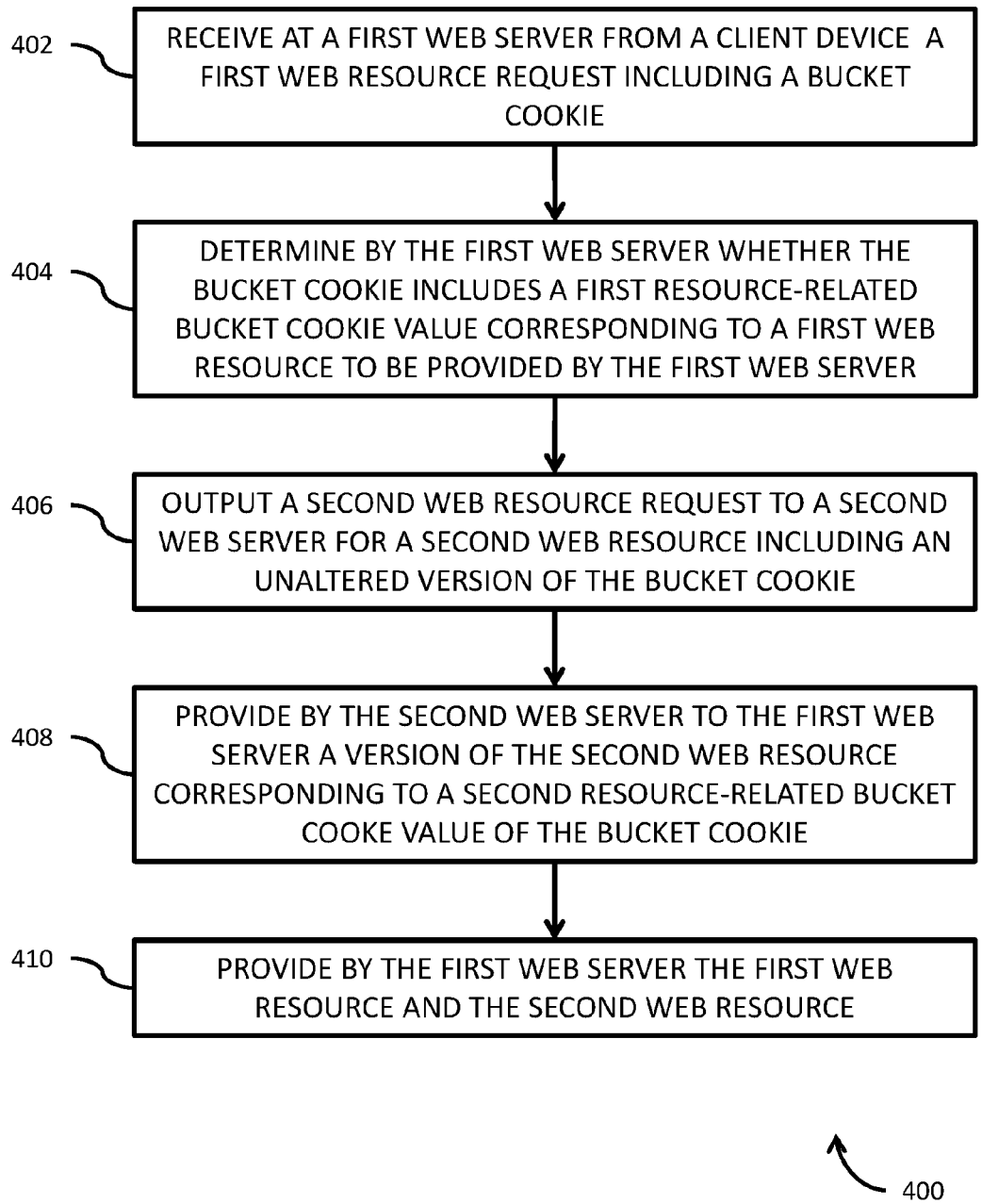

Turning now to FIG. 4, another alternative method 400 is illustrated in accordance with various embodiments. Again, the method 400 is described with constant reference to the elements illustrated in FIG. 1. At step 402, the first web server 102 receives from a client device 112 a first web resource request including a bucket cookie. This receipt is indicated in FIG. 1 as communication 116. At step 404, the first web server 102 determines whether the bucket cookie includes a first resource-related bucket cookie value corresponding to a first web resource to be provided by the first web server 102. This can be performed by the first web server 102 reviewing the bucket cookie and searching for a particular resource-related bucket cookie value name that corresponds to the web resource it provides. If a first resource-related bucket cookie value does correspond to the first web resource, the first web server 102 can provide to the client device 112 the particular version of the first web resource indicated by the first resource-related bucket cookie value. If not, the first web server 102 can provide the present live version of the first web resource.

At step 406, the first web server 102 can output a second web resource request to a second web server 104 for a second web resource. This output is indicated in FIG. 1 by communication 118 or 120. For example, the second web resource may be required by the first web server 102 to fulfill the first web resource request. The second web resource request may include the unaltered bucket cookie sent to the second web server 104.

After receipt of the second web resource request from the first web server 102, the second web server 104 may determine whether the bucket cookie includes a second resource-related bucket cookie value corresponding to a second web resource to be provided by the second web server 104. If so, at step 408, the second web server 104 may provide a particular version of the second web resource indicated by the second resource-related bucket cookie value. This is indicated in FIG. 1 by communication 130 or 132. At step 410 the first web server 102, after receipt of the second web resource, may provide to the client device 112 the first web resource (if it has not yet done so) and the second web resource. This is indicated in FIG. 1 by communication 134.

If a web server receives a bucket cookie including an invalid bucket cookie value related to a web resource that the web server provides, in one embodiment, the web server may return an error. In another embodiment, the web server may simply return the present live version of the web resource. However, in certain application settings (e.g., testing), returning an error or another indication that the web resource request is invalid may be more beneficial as it will indicate to the user that they are not capable of running the specified version. If the present live version is returned, in a testing setting, the user may discover errors or other testing anomalies without the knowledge that the errors may have been caused by an improper version of a web resource being provided.

Some web servers 100 may implement web resource caching. For example, the first web server 102 may cache a received version of a second web resource from a second web server 104 in a data store 114. As is understood in the art, caching can reduce access time for web resources and limit repetitive data traffic on various networks. However, in certain embodiments of the present disclosure, caching can present an issue as to providing particular versions of web resources. For example, if the first web server 102 does cache the second web resource from the second web server 104, but a client device 112 specifies a particular version of the second web resource in a bucket cookie, the first web server 102 may simply return its cached version of the second web resource. This cached version may or may not be the correct particular version specified in the bucket cookie. This may be due in part to the fact that the first web server 102 is not required to have knowledge of what versions are available for the second web resource or even whether a particular version is requested.

Figure 5:
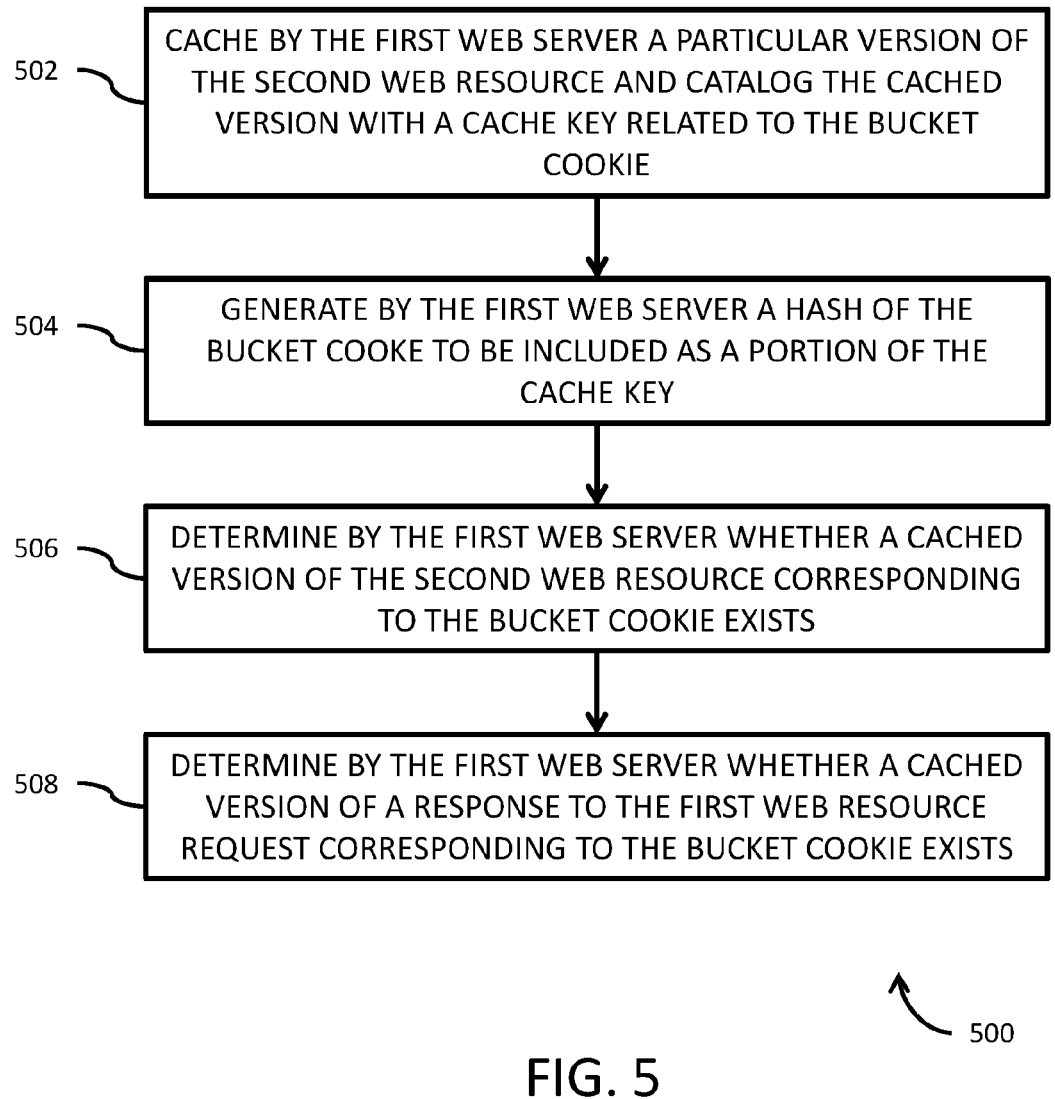

One solution is to disable caching in systems implementing the disclosed bucket cookie techniques. However, this may not be suitable for every application setting. At least one method 500 in FIG. 5 is described to allow caching while implementing the bucket cookie techniques. In one embodiment, at step 502, the first web server 102 may cache a particular version of the second web resource received from the second web server 104. The first web server 102 can also catalog that cached version with a cache key related to the bucket cookie. This cache key may be associated with the appropriate cached version of the second web resource via a lookup table or other known technique of cataloging. In this embodiment, the first web server 102 may store multiple versions of the second web resource, each cataloged with a particular cache key corresponding to a unique bucket cookie.

One method of generating the cache key, as is illustrated at step 504, is for the first web server 102 to generate a hash of the bucket cookie to be or be included as a part of the cache key. The hash may be generated by any known means and will yield a unique hash value for each unique bucket cookie. This hash value may then be used as or as part of the cache key. In one embodiment, the entire bucket cookie is run through the hash algorithm so that the entire bucket cookie is accounted for in the cache key. In this embodiment, multiple instances of the same version of a second web resource may be cached with different corresponding cache keys. This is because if any individual resource-related bucket cookie value within the bucket cookie is added, removed, or changed, a different cache key will be generated. This is true even if the change within the bucket cookie is entirely independent of the second web resource. Thus two different first web resource requests may actually use the same version of the second web resource, but may request different versions of other secondary web resources. Because the first web server 102 is not required to be aware of which versions of secondary web resources are available, it is not required to be aware of which individual resource-related bucket cookie value within the bucket cookie correspond to which secondary web resources. Therefore, the first web server 102 may assume that any change in the bucket cookie could be pertinent to the particular cached version of the second web resource and therefore may assume the need to cache a newly received version of the second web resource.

In an alternative embodiment, the first web server 102 may be able to run a hash over a cached version of a second web resource or compare it to other cached versions to determine if repeat versions of the second web resource are stored in the cache. The first web server 102 could then subsequently redirect various ones of the cache keys associated with repeat instances of a cached version of the second web resource to a single stored version to reduce storage space if so desired.

At step 506, the first web server 102 may determine whether a cached version of the second web resource corresponding to the bucket cookie exists. For example, if a cached version does exist with a particular cache key generated from a particular bucket cookie, if the same bucket cookie is subsequently submitted, the first web server 102 can generate the cache key from that bucket cookie and see that it matches a cache key already generated. The first web server 102 can then return that corresponding cached version of the second web resource.

Similarly, at step 508, the first web server 102 can determine if a cached version of an output responsive to the first web resource request and corresponding to the bucket cookie exists. This output version may be an output that includes various secondary web resources incorporated with the first web resource (e.g., a complete webpage). The first web server 102 can generate a cache key from the received bucket cookie and determine if a matching cache key already exists. If a match is found, the first web server 102 can thereafter return the corresponding cached version of the output to the client device 112 (or requesting web server).

Although the embodiments described herein refer to a first web server 102, it should be understood that, because the embodiments may be recursively implemented, the embodiments are able to be implemented on a second web server 104, third web server 106, and so forth. The designation "first web server" does not necessarily indicate that it is the first web server to respond to a web resource request generated at an originating client device 112, but merely that it is a first web server of a particular portion of web servers within a recursive string of web servers implementing a web resource request. Further, it should be understood that the first web server 102, or any of the other web servers 100 may be configured to perform various ones of the steps outlined in the various methods of FIGS. 2-5.

In various embodiments, a bucket cookie may be a web cookie, browser cookie, or HTTP cookie that can be generated by a requesting user or requesting device using a browser as is understood in the art. The bucket cookie is sent to the web server as part of or along with a web resource request. For example, a bucket cookie may have the following form:

Cookie:
tekcub=bucket_site_key1=bucket_id1&bucket_site_key2=bucket_id2 . . . &bucket$_{13}$ site_keyN=bucket_keyN;

The example cookie name "tekcub" (bucket spelled backwards) may be used, or another cookie name may be used. However, the bucket cookie name should be consistent so that a web server implementing the bucket cookie technique can identify the bucket cookie as such. The bucket cookie may include a single resource-related bucket cookie value or a plurality of resource-related bucket cookie values. Individual resource-related bucket cookie values may each have the form bucket_site_key=bucket_id. A bucket_site_key may be a short unique name used to identify a web resource to which the bucket_id applies. In certain approaches, a registry of bucket_site_key may be implemented and maintained so that duplicate identifiers are reduced or eliminated. The bucket_id may be a unique identifier for a particular version of a web resource (i.e., the web resource identified by the bucket_site_key identifier). For example, a resource-related bucket cookie value specifying a particular version of an email resource may look something like the following: email_service=email_build_08772. Similarly, a resource-related bucket cookie value specifying a particular version of a web store interface may look something like the following: web_store=update-057. An example of an overall bucket cookie may look something like the following:

Cookie: tekcub=email_service=email_build_087721
&web_store=update-057&email_inbox=ver93.32

&front_of_service=master-v.6.3&header_gif=soccer34;

It should be understood that many variations are possible as to the format of the bucket cookie while still achieving the same result.

So described, methods are provided that allow for implementation of a virtually limitless variety of versions of web resources to be specified at run-time with little to no additional overhead maintenance. Further, the embodiments describe a mechanism by which users can elect to utilize particular versions of web resources without directly interacting with those web resources or without even having direct access to those web resources. Moreover, in some embodiments, run-time version specification can be propagated beyond a second level of web resources to further levels, thereby increasing the versatility and usefulness of run-time version specification.

The schematic flow chart diagrams included are generally set forth as logical flow-chart diagrams. As such, the depicted order and labeled steps are indicative of various embodiments of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Various embodiments of the invention may be implemented at least in part in any conventional computer programming language. For example, some embodiments may be implemented in a procedural programming language (e.g., "C", and the like), or in an object oriented programming language (e.g., "C++" "JAVA", and the like). Other embodiments of the invention may be implemented as preprogrammed hardware elements (e.g., application specific integrated circuits, FPGAs, and digital signal processors), or other related components.

In some embodiments, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WiFi, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention has been described in terms of one or more preferred embodiments, and it should be appreciated that many equivalents, alternatives, variations, and modifications, aside from those expressly stated, are possible and within the scope of the invention.

We claim:

1. A method, comprising:
   receiving, by a first web server from a client device, a first web resource request for a first web resource, the first web resource request including a cookie, the cookie including a version value;
   outputting, by the first web server, a second web resource request to a second web server for a second web resource corresponding to version value in the cookie, the second web resource request including an unaltered version of the cookie;
   receiving, by the first web server from the second web server in response to the second web resource request, the second web resource corresponding to version value in the cookie;
   providing, by the first web server to the client device, at least one of the first web resource and the second web resource: and
   outputting, by the first web server or the second web server, a third web resource request to a third web server for a third web resource, the third web resource request including the unaltered version of the cookie.

2. The method of claim 1, further comprising determining, by the first web server, whether a cached version of the second web resource corresponding to the cookie exists.

3. The method of claim 1, wherein the first web resource request corresponds to a request to access a website and the second web resource comprises a backend service.

4. The method of claim 1, further comprising:
   caching the second web resource: and
   cataloging a cached version of the second web resource with a cache key related in part to the cookie.

5. The method of claim 4, wherein cataloging the cached version of the second web resource includes generating a hash of the cookie to be included as at least a portion of the cache key.

6. A method, comprising:
   receiving, by a first web server electronically connected to a computer network, a first web resource request from a requester, the first web resource request including a bucket cookie and a first web resource address for a first web resource;
   identifying, by the first web server, a second web resource required to fulfill the first web resource request;
   generating, by the first web server, a second web resource request, including a second web resource address corresponding to the second web resource and including the bucket cookie;
   transmitting, by the first web server, the second web resource request to a second web server; and
   outputting, by the first web server or the second web server, a third web resource request to a third web server for a third web resource, the third web resource request including an unaltered version of the bucket cookie.

7. The method of claim 6, wherein the second web resource request includes the unaltered version of the bucket cookie.

8. The method of claim 6, further comprising receiving, by the first web server, the second web resource, the second web resource comprising a version of the second web resource determined by a value in the bucket cookie.

9. The method of claim 8, further comprising responding, by the first web server, to the first web resource request by providing at least the second web resource to the requester.

10. The method of claim 6, wherein the first web resource request corresponds to a request to access a website and the second web resource comprises a backend service.

11. The method of claim 6, further comprising determining, by the first web server, whether a cached version of the second web resource exists.

12. The method of claim 6, further comprising determining, by the first web server, whether a cached version of a response to the first web resource request exists.

13. A computer server, comprising:
   a memory storing computer code encoding instructions;
   a processor configured to execute the instructions encoded in the computer code to perform the steps of:
   receiving, by a first web server electronically connected to a computer network, a first web resource request from a requester, the first web resource request including a bucket cookie and a first web resource address for a first web resource;
   identifying, by the first web server, a second web resource required to fulfill the first web resource request;
   generating, by the first web server, a second web resource request, including a second web resource address corresponding to the second web resource and in the bucket cookie;
   transmitting, by the first web server, the second web resource request to a second web server; and
   outputting, by the first web server or the second web server, a third web resource request to a third web server for a third web resource, the third web resource request including an unaltered version of the bucket cookie.

14. The computer server of claim 13, wherein the second web resource request includes the unaltered version of the bucket cookie.

15. The computer server of claim 13, further comprising instructions encoded in the computer code to perform the step of receiving, by the first web server, the second web resource, the second web resource comprising a version of the second web resource determined by a value in the bucket cookie.

16. The computer server of claim 15, further comprising instructions encoded in the computer code to perform the step of responding, by the first web server, to the first web resource request by providing at least the second web resource to the requester.

17. The computer server of claim 13, wherein the first web resource request corresponds to a request to access a website and the second web resource comprises a backend service.

18. The computer server of claim 13, further comprising instructions encoded in the computer code to perform the step of determining, by the first web server, whether a cached version of the second web resource exists.

19. The computer server of claim 13, further comprising instructions encoded in the computer code to perform the step of determining, by the first web server, whether a cached version of a response to the first web resource request exists.

* * * * *